United States Patent
Liu et al.

(10) Patent No.: US 8,498,352 B2
(45) Date of Patent: *Jul. 30, 2013

(54) SYMMETRICAL DATA SIGNAL PROCESSING

(75) Inventors: Hong Liu, Ewing, NJ (US); Raul A. Casas, Doylestown, PA (US); Haosung Fu, Levittown, PA (US)

(73) Assignee: ATI Technologies ULC, Markham (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/290,256

(22) Filed: Nov. 7, 2011

(65) Prior Publication Data

US 2012/0051412 A1 Mar. 1, 2012

Related U.S. Application Data

(60) Continuation of application No. 12/465,322, filed on May 13, 2009, now Pat. No. 8,054,900, which is a division of application No. 11/347,747, filed on Feb. 3, 2006, now Pat. No. 7,551,679.

(51) Int. Cl.
*H04L 27/28* (2006.01)

(52) U.S. Cl.
USPC ........... 375/260; 375/232; 375/233; 370/203; 455/154.1

(58) Field of Classification Search
USPC ......... 375/260, 232, 233; 370/203; 455/154.1
See application file for complete search history.

(56) References Cited

U.S. PATENT DOCUMENTS

| | | | | |
|---|---|---|---|---|
| 6,633,614 B1 * | 10/2003 | Barton et al. | ................. | 375/264 |
| 6,654,431 B1 * | 11/2003 | Barton et al. | ................. | 375/346 |
| 6,680,971 B1 | 1/2004 | Tazebay et al. | | |
| 6,882,373 B2 | 4/2005 | Hong et al. | | |
| 6,975,689 B1 | 12/2005 | McDonald et al. | | |
| 6,980,609 B1 | 12/2005 | Ahn | | |
| 7,324,437 B1 * | 1/2008 | Czylwik et al. | ............... | 370/210 |
| 7,359,450 B1 | 4/2008 | Payne, III et al. | | |
| 7,450,653 B2 | 11/2008 | Abe | | |
| 7,609,773 B2 * | 10/2009 | Bhushan et al. | ............. | 375/260 |
| 7,961,697 B2 * | 6/2011 | Ma et al. | ........................ | 370/344 |
| 2002/0186763 A1 | 12/2002 | Kennedy et al. | | |
| 2004/0081191 A1 * | 4/2004 | Kwon et al. | .................. | 370/431 |
| 2004/0095907 A1 * | 5/2004 | Agee et al. | ..................... | 370/334 |
| 2005/0090213 A1 | 4/2005 | Heng et al. | | |
| 2005/0105651 A1 | 5/2005 | Jaffe et al. | | |
| 2005/0152267 A1 * | 7/2005 | Song et al. | ..................... | 370/210 |
| 2006/0045169 A1 * | 3/2006 | Kim | .............................. | 375/144 |
| 2006/0115010 A1 * | 6/2006 | Rog et al. | ...................... | 375/260 |

OTHER PUBLICATIONS

Park et al., IEEE Commun. Lett., 8(5):274-276 (2004).

(Continued)

*Primary Examiner* — Danh Le
(74) *Attorney, Agent, or Firm* — Volpe and Koenig, P.C.

(57) ABSTRACT

A digital communications receiver includes an input configured to receive, via a communications channel, a received first signal representing a sequence of symbols, each symbol being encoded to be representative of a plurality of data bits. A processor adjusts a magnitude and filters the received signal. An equalizer applies a cyclic prefix restoration to the adjusted and filtered signal, producing a second signal, converts the second signal from time domain to frequency domain to produce a frequency domain signal, and determines a first quantity of values representing a first portion of the symbols by evaluating a relationship of channel values representing characteristics of the communications channel and a second quantity of values representing a portion of the frequency domain signal, the first quantity being smaller than the second quantity.

17 Claims, 6 Drawing Sheets

OTHER PUBLICATIONS

Schniter, P., IEEE 2000 Symposium on Adaptive Systems for Signal Processing, Communication, and Control. pp. 1-6 (2000).

Schniter et al., Proc. Asilomar Conf. on Signals, Systems, and Computers, (Pacific Grove, CA), pp. 667-671 (Nov. 2004).

Shah et al., Proceedings of the Statistical Signal and Array Workshop, (Pocono Manor, PA), pp. 645-649 (Aug. 2000).

Tüchler et al., IEEE Transactions on Signal Processing, 50(3):673-683 (Mar. 2002).

Eory, F., et al., "Comparison of Adaptive Equalization Methods for the ATSC and DVB-T Digital Television Broadcast Systems," Proceedings of the 2000 Third IEEE International Conference on Devices, Circuits and Systems, 2000, Piscataway, NJ, USA, IEEE, Mar. 15, 2000, pp. 487-493.

Won et al., "Iterative Cyclic Prefix Reconstruction and Channel Estimation for a STBC OFDM System," IEEE Communications Letters, IEEE Service Center, Piscataway, NJ, USA, 9(4): 307-309 (2005).

Wu, et al., "ISI Mitigation and Channel Tracking in Mimo-OFDM Systems," Proceedings of the 2005 International Symposium on Intelligent Signal Processing and Communication Systems, 2005, ISPACS 2005, Hong Kong, Dec. 13016, 2005, Piscataway, NJ, USA, IEEE, Dec. 13-16, 2005, 101-104.

Ghogho M et al: "Blind frequency-offset estimator for OFDM systems transmitting constant-modulus symbols", IEEE Communications Letters, IEEE Service Center, Piscataway, NJ, US, vol. 6, No. 8, Aug. 2002, pp. 343-345, XP011429941, ISSN: 1089-7798, DOI: 10.1109/LCOMM.2002.802040.

Keller T et al: "Adaptive multicarrier modulation: a convenient framework for time-frequency processing in wireless communications", Proceedings of the IEEE, IEEE, New York, US, vol. 88, No. 5, May 2000, pp. 611-640, XP011450711, ISSN: 0018-9219, DOI: 10.1109/5.849157.

Bertrand Muquet et al: "Cyclic Prefixing or Zero Padding for Wireless Multicarrier Transmissions?", IEEE Transactions on Communications, IEEE Service Center, Piscataway, NJ. USA, vol. 50, No. 12, Dec. 2002 XP011071075, ISSN: 0090-6778.

\* cited by examiner

SYMMETRICAL DATA SIGNAL PROCESSING

CROSS REFERENCE TO RELATED APPLICATION

This application is a continuation of U.S. patent application Ser. No. 12/465,322 filed May 13, 2009 which is a division of U.S. patent application Ser. No. 11/347,747, now issued U.S. Pat. No. 7,551,679, filed Feb. 3, 2006, which are incorporated by reference as if fully set forth.

FIELD OF INVENTION

This application relates to data transmission.

BACKGROUND

Today, many forms of information are sent from information sources, such as television content providers, to receivers, such as televisions in people's homes. Thus, an example of such information is digital television (DTV) information. Transmitting digital information typically involves converting the digital information to an analog signal and modulating an RF (radio frequency) carrier frequency's amplitude and/or phase using the analog signal, and sending the modulated signal over a propagation medium.

Referring to FIG. 1, a communications system 200 includes a transmitter 202 and a receiver 204. The transmitter 202 and the receiver 204 have respective antennas 206, 208, here shown externally to the transmitter 202 and the receiver 204, although the antennas 206, 208 may be considered to be parts of the transmitter 202 and the receiver 204. The transmitter 202 is configured to send information over a propagation medium, here a terrestrial broadcast system, to the receiver 204. Transmitting information over the propagation medium introduces signal distortion caused by noise w(t) (e.g., static), strength variations (fading), phase shift variations, multiple path delays, etc. Multiple path delays result from the transmitted signals taking different paths between the transmitter and receiver through the propagation medium, e.g., due to reflections off buildings 210 and/or relay through repeater stations 212. Different paths of a transmitted signal p(t) result in different gains $g_0$, $g_1$, $g_2$, and different delay times $d_0$, $d_1$, $d_2$ that cause replicas $g_1 p(t-d_1)$, $g_2 p(t-d_2)$ of the signal p(t) to arrive at different times at the receiver 204 (like an echo) compared to the directly-transmitted signal $g_0 p(t-d_0)$. The received signal r(t) is a combination of the directly-transmitted signal and/or the replicas, if any. Multi-path distortion results in inter-symbol interference (ISI) in which weighted contributions of other symbols are added to the current symbol.

In addition to distortion and noise from the propagation medium, front-end portions of the receiver and transmitter may also introduce distortion and noise. The presence of distortion, noise, fading and multi-path delays introduced by the overall communication channel (transmitter, receiver and propagation medium), can cause digital systems to degrade or fail when the bit error rate exceeds a threshold and overcomes the error tolerance of the system.

Equalization

Equalization is employed at the receiver to help compensate for distortion of the transmitted information. The transmitted information in a digital system is pulse shape filtered symbols having discrete levels of amplitude and/or phase. The digital receiver uses a slicer to make hard decisions as to the value of the received symbol. A slicer is a decision device responsive to the received signals at its input, which outputs the nearest symbol value from the constellation of allowed discrete levels. A slicer is also known as a nearest element decision device. To the extent that a symbol is received at a level that differs from one of the allowed discrete levels, a measure of communication channel error can be detected.

The receiver uses an equalizer that is responsive to the detected error to mitigate the signal corruption introduced by the communications channel. It is not uncommon for the equalizer portion of a receiver integrated circuit to consume half of the integrated circuit area.

An equalizer is a filter that attempts to match the inverse characteristics of the communication channel. If the transmission characteristics of the communication channel are known or measured, then the equalization filter parameters can be determined. After adjustment of the equalization filter parameters, the received signal is passed through the equalizer, which compensates for the non-ideal communication channel by introducing compensating "distortions" into the received signal which tend to cancel the distortions introduced by the communication channel. In most situations such as in HDTV broadcasting, however, each receiver is in a unique location with respect to the transmitter. Accordingly, the characteristics of the communication channel between the transmitter and any given receiver are not known in advance, and may even change with time. In those situations where the communication channel is not characterized in advance, or changes with time, an adaptive equalizer is used. An adaptive equalizer has variable parameters that are calculated at the receiver. The adaptive equalizer attempts to adjust the equalizer filter parameters in order to restore received signal quality to a performance level that is acceptable.

SUMMARY

In general, in an aspect, the invention provides, in a digital communications receiver configured to receive, via a communications channel, a received first signal representing a sequence of symbols, each symbol being encoded to be representative of data bits, a method of processing the received signal, the method including adjusting a magnitude, filtering, and applying cyclic prefix restoration, to the received signal to produce a second signal, converting the second signal from time domain to frequency domain to produce a frequency domain signal, and determining a first quantity of values representing a first portion of the symbols by evaluating a relationship of channel values representing characteristics of the communications channel and a second quantity of values representing a portion of the frequency domain signal, the first quantity being smaller than the second quantity.

Implementations of the invention may include one or more of the following features. The determining includes using conjugates of some of the first quantity of values to determine a third quantity of values representing a second portion of the symbols, the second quantity equaling the first quantity plus the third quantity. The first and second portions of the symbols are disposed on opposite sides of half of a rate for the received signal. The method further includes applying MAP detection to values related to the third quantity of symbol values. The determining includes iterating each of the first quantity of values using, for a respective one of the first quantity of values: information of a previous iteration value; and a variance associated with the previous iteration value. Using the information of a previous iteration value includes using an expected value of a symbol. The method further includes determining the variance and the confidence using probabilities that an estimated value of the first quantity of values is correct. The method further includes determining the characteristics of the channel using estimates of values of the first quantity of values. The second quantity of values includes in-band and out-of-band values. The second quantity of values includes in-band values, and the determining includes setting out-of-band values to zero.

In general, in another aspect, the invention provides a digital communications receiver for receiving a VSB signal representing a sequence of encoded symbols each representative of data bits, the receiver including an input configured to receive a VSB signal from a communications channel, an amplification and filtration device coupled to the input and configured to adjust a magnitude of, and to filter, the VSB signal to produce a scaled and filtered VSB signal, and a virtual sub-carrier estimator coupled to the amplification and filtration device and configured to process the scaled and filtered VSB signal to estimate virtual sub-carriers such that the virtual sub-carriers are conjugate symmetric.

Implementations of the invention may include one or more of the following features. The virtual sub-carrier estimator is configured to alter the scaled and filtered VSB signal such that a time-domain matrix indicative of characteristics of the channel is in circulant form, to convert the circulant matrix to frequency domain, and to determine a first set of symbol values using the converted matrix of channel characteristics and a second set of data points indicated by the scaled and filtered VSB signal, where the first set includes fewer symbol values than data points included in the second set. The virtual sub-carrier estimator is configured to produce a third quantity of symbol values by using the first quantity of symbol values for a first portion of the third quantity of symbol values, and using conjugates of some of the first quantity of symbol values to determine a second portion of the third quantity of symbol values. The first and second portions of the third quantity of symbol values are disposed on opposite sides of half of a symbol rate for the received signal. The second quantity of data points includes in-band data and out-of-band data. The second quantity of data points includes in-band data, and the virtual sub-carrier estimator is configured to set values for out of band data points to zero. The virtual sub-carrier estimator is a frequency domain turbo equalizer.

In general, in another aspect, the invention provides an integrated circuit chip for receiving and processing a VSB signal representing a sequence of encoded symbols each representative of a plurality of data bits, the chip including an input configured to receive a VSB signal from a communications channel, front-end processing circuitry coupled to the input and configured to alter characteristics of the VSB signal to produce a modified signal having a desired format, and virtual sub-carrier estimator circuitry coupled to the front-end processing circuitry and configured to process the modified signal to estimate virtual sub-carriers such that the virtual sub-carriers are conjugate symmetric.

Implementations of the invention may include one or more of the following features. The virtual sub-carrier estimator circuitry is configured to alter the modified signal such that a time-domain matrix indicative of characteristics of the channel is in circulant form, to convert the circulant matrix to frequency domain, and to determine a first set of symbol values using the converted matrix of channel characteristics and a second set of data points indicated by the modified signal, where the first set includes fewer symbol values than data points included in the second set.

In accordance with implementations of the invention, one or more of the following capabilities may be provided. Matrix inversion performed by a DTV signal equalizer can be reduced compared to prior techniques. Implementation cost for a DTV signal equalizer can be reduced compared to prior techniques. A full set of received DTV signal data points can be used to determine a reduced-set of received symbols, which can be used to determine the full set of received symbols for vestigial sideband (VSB) transmissions. A frequency domain turbo equalizer can be applied to VSB DTV transmissions.

These and other capabilities of the invention, along with the invention itself, will be more fully understood after a review of the following figures, detailed description, and claims.

DETAILED DESCRIPTION

Embodiments of the invention provide techniques for determining digital television (DTV) signal information, and in particular for determining DTV vestigial sideband modulated (VSB) symbols in view of multipath transmission effects. For example, a DTV receiver includes analog and digital front-end processing, an analog-to-digital converter, an equalizer, a channel decoder, and a source decoder. The equalizer is configured as a frequency domain turbo equalizer and is configured to process VSB input signals. The equalizer performs cyclic prefix (CP) restoration on received data and applies minimum mean squared error estimation using data derived from a set of received data points in the time domain to determine a reduced set of estimated symbol values in the frequency domain. The reduced set of symbol values in the frequency domain is used to derive a larger set of time domain symbol values (e.g., equal in number to the set of received data points), which are used to determine the incoming bit stream of, and thus information in, the incoming VSB signals. This equalizer configuration is exemplary, however, and not limiting of the invention as other implementations in accordance with the disclosure are possible.

Figure 1:
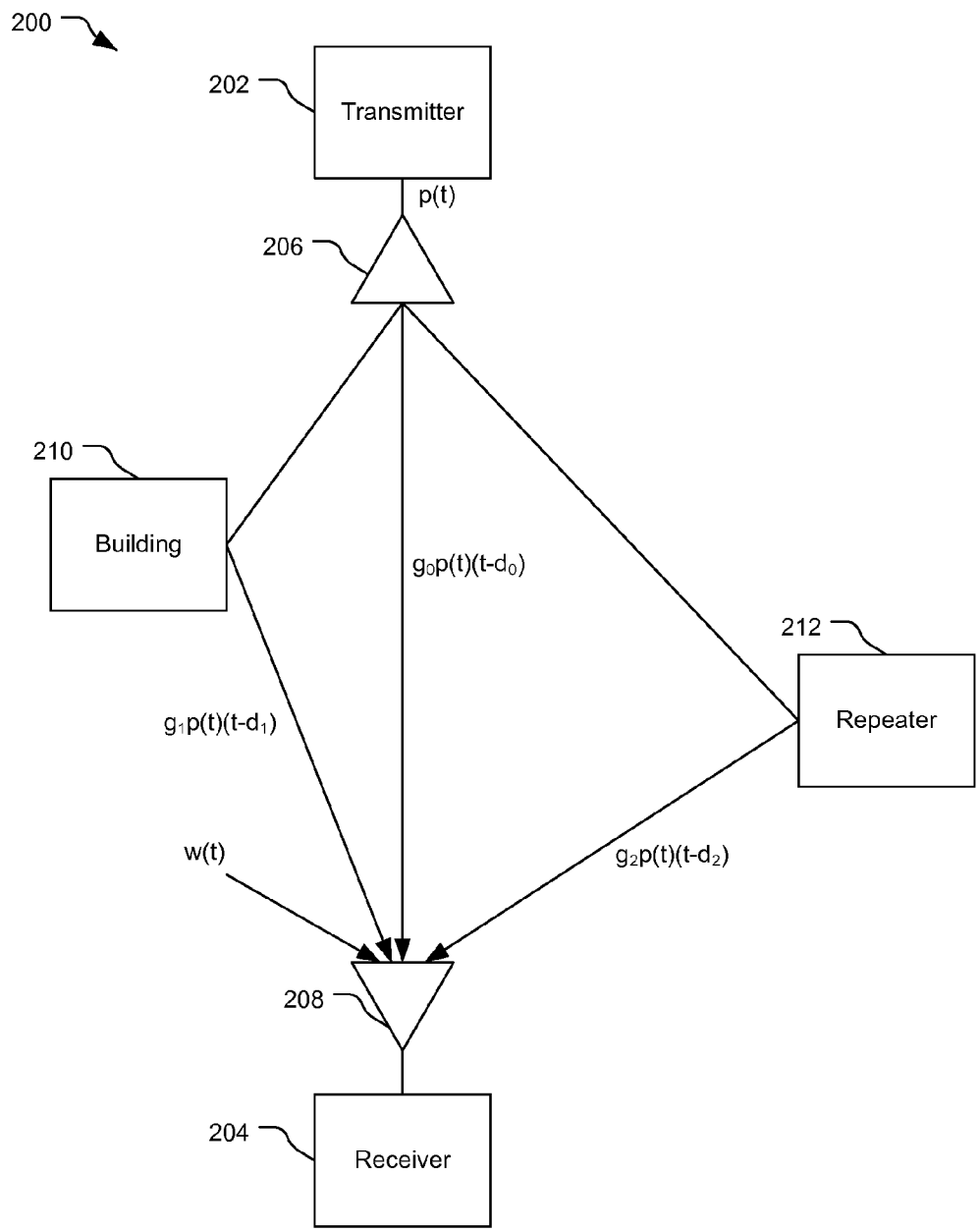
FIG. 1 is a schematic diagram of a transmission channel.
Figure 2:
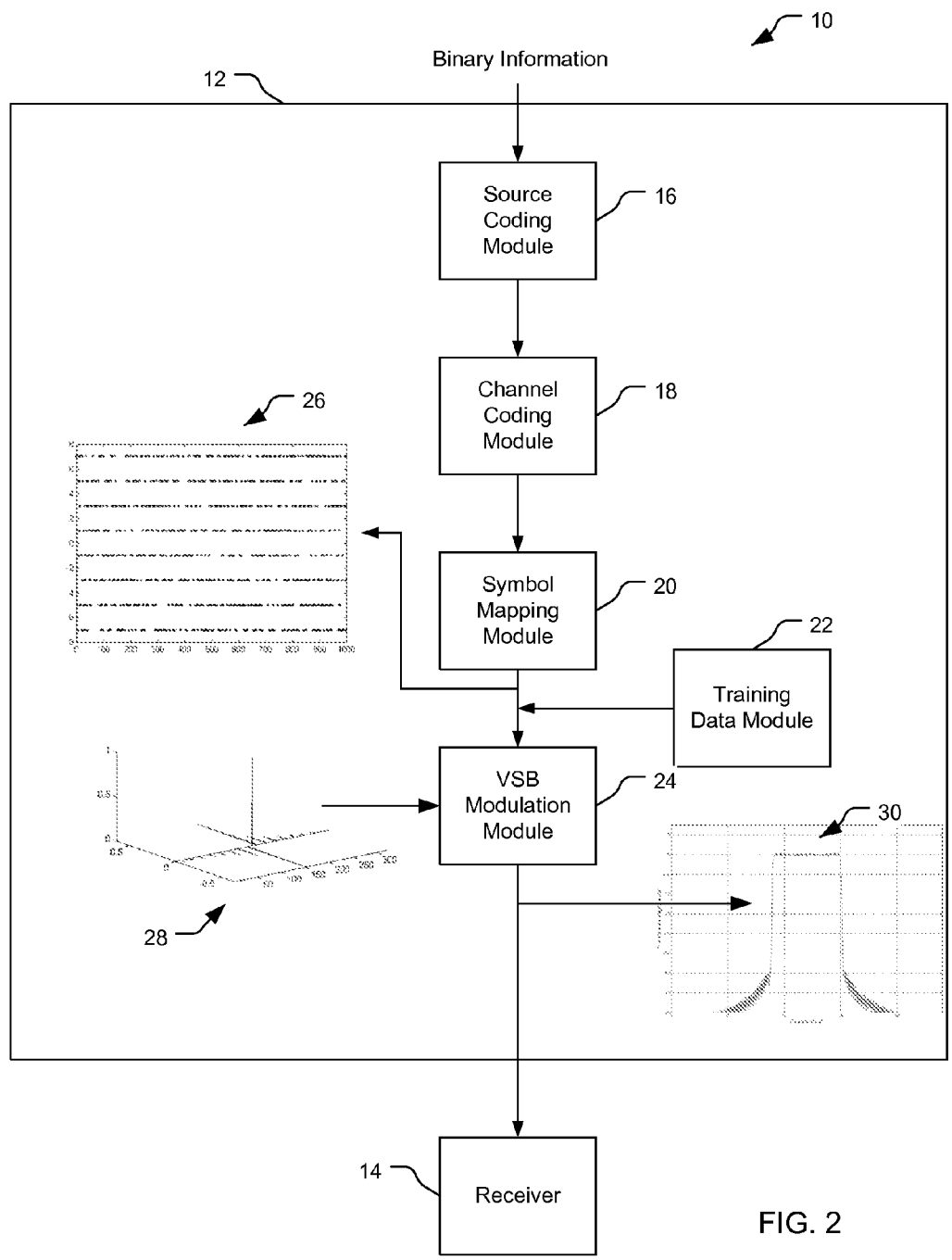
FIG. 2 is a block diagram of a communications system including a vestigial sideband transmitter and a receiver.

Referring to FIG. 2, a communications system 10 includes a transmitter 12 and a receiver 14. The transmitter 12 and receiver 14 may be configured to communicate various types of information. Here, as an example only and not as a limitation of the invention, the transmitter 12 is a VSB transmitter for digital television (DTV) signals and the receiver 14 is a DTV receiver such as a digital television or a set-top box and digital television combination. In particular, the system 10 is configured to transmit and receive terrestrial DTV signals in accordance with the ATSC standard for North American DTV transmission. The transmitter 12 includes appropriate hardware, firmware, and/or software to implement the functions described below. The transmitter 12 includes an antenna (not shown) for sending modulated signals over a transmission medium.

The transmitter 12 includes a source encoder module 16, a channel encoder 18, a symbol mapping module 20, a training data module 22, and a VSB modulation module 24. The source encoder 16 is configured to receive binary payload data, e.g., digital audio and video information. The source encoder 16 compresses the data, e.g., in accordance with MPEG encoding, for efficient transmission. The channel encoder 18 adds redundancy, e.g., using Trellis encoding and/or Reed-Solomon encoding, to the data to protect it from transmission errors. The output from the channel encoder 18 is a binary stream of information. The symbol mapping module 20 maps the binary stream from the channel encoder 18 onto a discrete set of symbols. In the case of VSB modulations, the binary data are mapped on to a set of real-valued symbols. Here, for the ATSC standard (also known as 8-VSB), the transmitter 12 maps the 3-bit binary sequences 001, 010, 011, . . . , 110, 111, to eight symbols $\pm 1$, $\pm 3$, $\pm 5$, $\pm 7$ corresponding to eight voltage levels. A plot 26 shows exemplary 8-VSB symbols versus time. The training data module 22 inserts a pilot signal as a reference for subsequent use by the receiver 14 when performing down-conversion of the received signal from RF to baseband, and periodically inserts a small set of known training symbols into the payload symbol stream to aid in the process of reception. The VSB modulation module 24 applies the Hilbert transform, shown as a plot 28, to pulse-shape filter and convert the real-valued symbols to complex-valued data occupying about half the spectrum of the original, symmetric symbol stream. The VSB modulation module 24 further converts the resulting information into an analog signal and up-converts this signal to an RF signal, having a power spectrum shown by a plot 30, for transmission through a transmission medium to the receiver 14.

Figure 3:
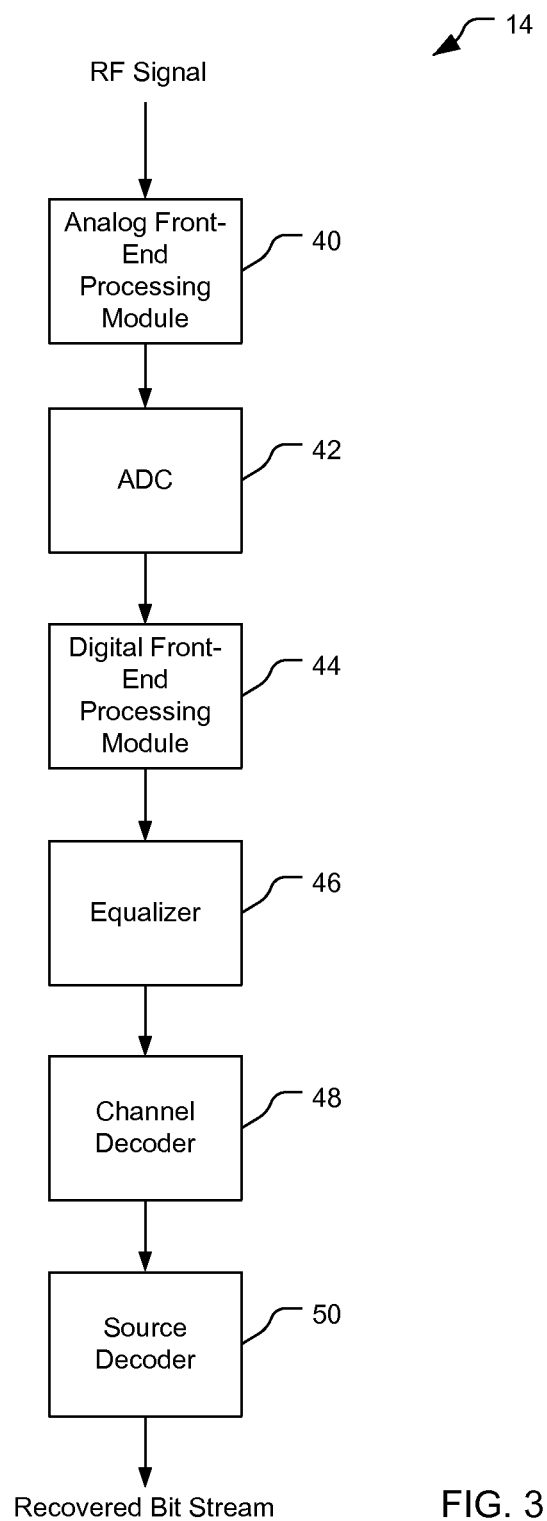
FIG. 3 is a block diagram of functional elements of the receiver shown in FIG. 2.

Referring to FIG. 3, the receiver 14 includes an analog front-end processing module 40, an analog-to-digital converter (ADC) 42, a digital front-end processing module 44, an equalizer 46, a channel decoder 48, and a source decoder 50. The receiver 14 is configured to receive the RF signal from the transmitter 12 (FIG. 2) through the receiver's antenna (not shown), and process the received signal to produce a recovered bit stream that is close to, if not the same, as the binary information that is the input to the transmitter 12.

The analog front-end processing module 40, the ADC 42, and the digital front-end processing module 44 are configured to convert the received RF signal to timed, baseband data. The received RF signal is processed by the analog front-end processing module 40 that performs tuning, amplification, and filtering. The module 40 down-converts the spectrum of the high radio frequency signal to a lower, intermediate frequency (IF), e.g., 44 MHz (although a receiver may be used that converts the signal directly to 0 MHz (i.e., a zero-IF, or ZIF, tuner). The analog front-end processing module 40 also amplifies or attenuates the resulting IF signal to fit into a specific voltage range that can be subsequently sampled by the ADC 42. The ADC 42 converts the amplitude-adjusted, IF signal into a digital stream using a sample rate of, e.g., about 25 MHz for ATSC signals. The resulting digital stream of information is processed by the digital front-end processing module 44 to precisely down-convert the IF signal to baseband, typically centered around 0 Hz. The digital front-end processing module 44 performs baseband tuning, amplification (possibly), and re-sampling (timing adjustment). The digital front-end processing module 44 also down-samples the signal in a timing circuit from the sample rate, e.g., about 25 MHz, to match the transmitted symbol rate of 10.76 Msymbols/sec for ATSC signals, or an integer multiple of the symbol rate. The output stream from the digital front-end processing module 44 is timed, baseband data.

Figure 4:
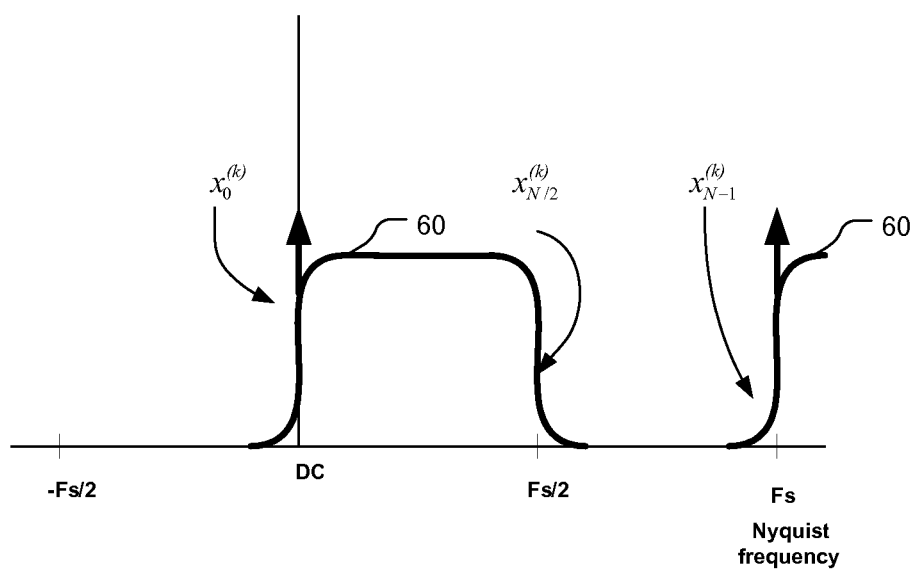
FIG. 4 is a power spectrum of a timed, baseband, complex-valued ATSC signal with symbol rate Fs.

Referring also to FIG. 4, a plot 60 shows the power spectrum of a timed, baseband, complex-valued ATSC signal with symbol rate Fs. This signal is a complex, VSB-modulated signal that occupies about half the bandwidth of the real-valued symbol sequence. The spectrum 60 occupies about half of the rate, Fs/2. Also, the edge of the spectrum 60 is located at DC, or zero frequency. Even though the spectrum 60 is located to the right of DC, the real (in-phase) and imaginary (quadrature) components of the spectrum 60 are individually centered around DC. A single tone 62 exists at DC, which is the pilot signal that was added to the symbol stream by the transmitter 12 (FIG. 2) to provide a reference to the receiver 12 for precise down-conversion of the RF signal to baseband. As shown, the plot 60 repeats because sampling in the time domain is reflected by multiple representations at integer multiples in the frequency domain. The timed baseband data, absent multipath effects, would be the real values of the VSB data (i.e., the symbols $\pm 1$, $\pm 3$, $\pm 5$, $\pm 7$ in the plot 26) plus j times the Hilbert transform of the VSB data. Due to multipath effects, however, the actual timed baseband data includes these data, plus these data delayed in time and attenuated for each different path.

The equalizer 46, the channel decoder 48, and the source decoder 50 convert the timed, baseband data to the recovered bit stream. The equalizer 46 is configured to process the timed, baseband data to produce an estimate of the transmitted real-valued symbol stream by correcting the effect of multipath replicas. The equalizer 46 is also configured to compensate for additive noise and interference. Details of the equalizer functionality are provided below, which may be implemented using hardware and/or software. The output of the equalizer 46 is an estimate of the transmitted symbol sequence at the symbol rate. The channel decoder 48 and the source decoder 50 reverse the encoding (e.g., Trellis and/or Reed-Solomon encoding) performed by the source encoder 16 and the channel encoder 18 (FIG. 2) in the transmitter 12. In the case of ATSC modulation, the input to the source decoder 50 is MPEG-2 encoded video and audio at about 19 Mbits/sec.

Figure 5:
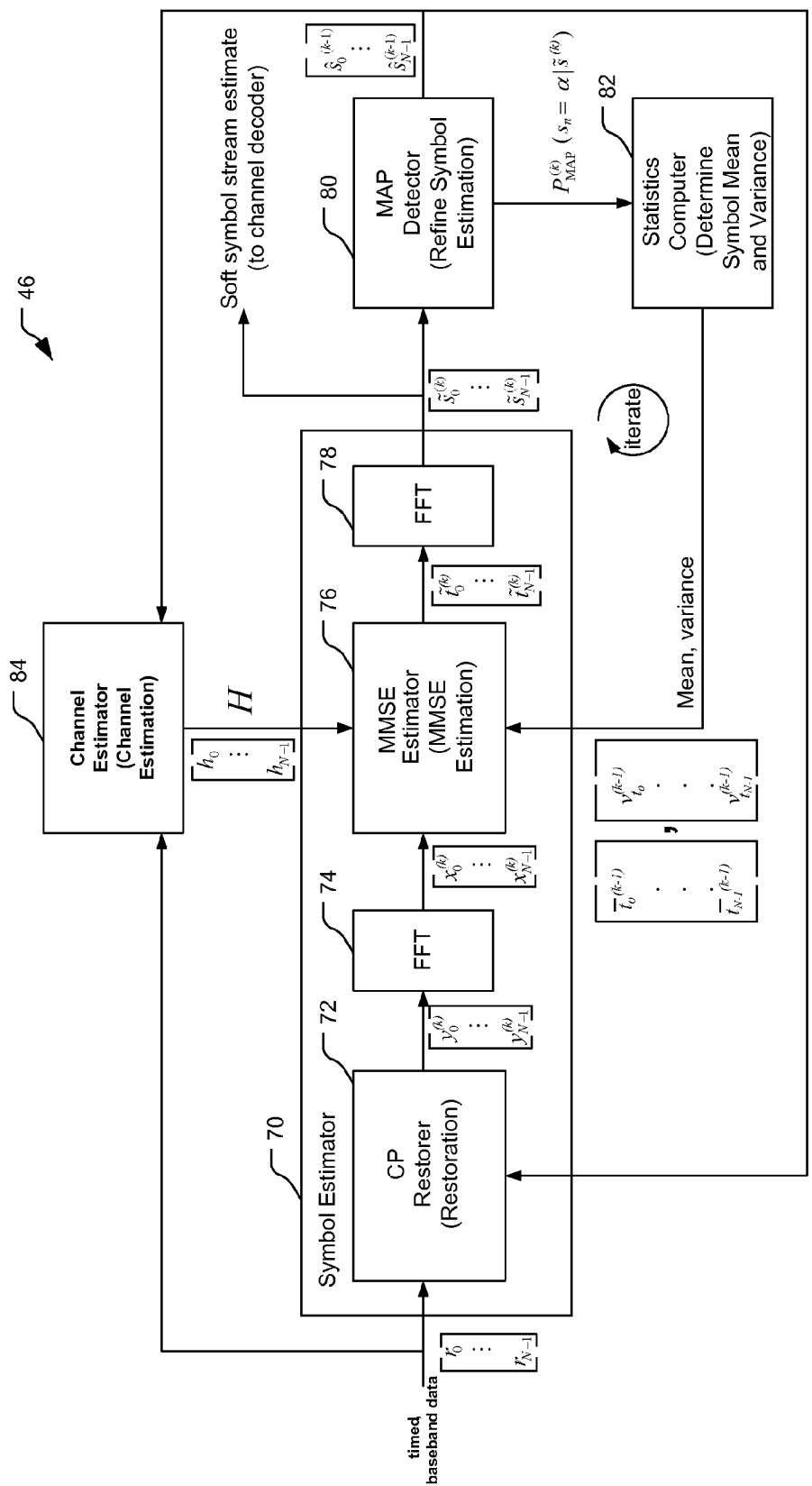
FIG. 5 is a block diagram of functional elements of, and process flow in, an equalizer shown in FIG. 3.

The equalizer 46 is configured to recover the stream of symbols transmitted by the transmitter 12 (FIG. 2) after the analog front-end processing module 40, the ADC 42, and the digital front-end processing module 44 have converted the received RF signal to timed, baseband data. Referring to FIG. 5, here the equalizer 46 is a frequency-domain turbo equalizer (FDTE) that includes a symbol estimator 70, a MAP detector 80, a statistics computer 82, and a channel estimator 84. The symbol estimator 70 includes a cyclic prefix (CP) restorer 72, a fast Fourier transform (FFT) module 74, a minimum mean squared error (MMSE) estimator module 76, and an FFT module 78. FDTEs are described in "Iterative Frequency-Domain Equalization for Single-Carrier Systems in Doubly-Dispersive Channels," P. Schniter and H. Liu, Proc. Asilomar Conf. on Signals, Systems, and Computers, (Pacific Grove, Calif.), pp. 667-671, November 2004. The FDTE 46 takes into account the structure of VSB-modulated data in the MMSE module 76. The FDTE 46 operates iteratively, taking symbol estimates and confidence information about those estimates from a previous iteration to produce new symbol estimates and confidence information for the next iteration. The FDTE 46 works on a block-by-block basis in the frequency domain and can be implemented in a computationally efficient manner.

The equalizer 46 is configured to take blocks of received timed, baseband data points, e.g., of size N, and process these data points to yield N symbol estimates. For each iteration k, the FDTE 46 performs, in summary (and discussed more fully below), the following actions.

1. The CP restorer 72 applies cyclic prefix restoration to the received data points r to conform a system model to a circulant channel matrix structure. When performing a first iteration (k=1), the restorer 72 uses weighted samples from a future block of received data, while for subsequent iterations (k>1) the restorer 72 uses hard symbol estimates from previous iterations (e.g., k−1) from the statistics computer 82.
2. The FFT module 74 transforms the data from the restorer 72 into the frequency domain using a discrete Fourier transform (implemented with a fast Fourier transform).
3. The MMSE module 76 obtains a minimum mean square error estimate of virtual sub-carriers that are frequency domain versions of the transmitted symbols. This estimate uses: (1) CP restored frequency domain information from the restorer 72, (2) an expectation value and variance of virtual sub-carriers from a previous iteration output from the statistics computer 82, and (3) a channel estimate from a previous iteration provided by the channel estimation module 84.
4. The FFT module 78 produces soft symbol estimates from the virtual sub-carrier estimates.
5. The MAP detector produces likelihood, or reliability information about the soft symbol estimates.
6. The statistics computer uses the likelihood information to derive hard symbol estimates and the expectation value and variance of virtual sub-carriers.
7. The channel estimation module 84 combines the hard estimates and the received data to update a channel matrix that characterizes the transmission channel.

The equalizer 46 is configured to convert a time domain system model to the frequency domain. For example, for a low-dimensional case with N=8

$$\begin{bmatrix} r_0 \\ r_1 \\ \vdots \\ r_7 \end{bmatrix} = \begin{bmatrix} h_1 & h_0 & & \\ & h_1 & h_0 & \\ & & \ddots & \ddots \\ & & & h_1 & h_0 \end{bmatrix} \begin{bmatrix} s_{-1} \\ s_0 \\ s_1 \\ \vdots \\ s_7 \end{bmatrix} + \begin{bmatrix} w_0 \\ w_1 \\ \vdots \\ w_7 \end{bmatrix} \quad (1)$$

where $r_i$ are the received data, $h_i$ are channel coefficients that characterize the channel properties (Hilbert transform, etc.), $s_i$ are the transmitted symbols, and $w_i$ are sampled noise and interference. For two non-zero channel coefficients, for the $n^{th}$ received data point, $r_n = h_1 s_{n-1} + h_0 s_n$. For an arbitrary number of non-zero channel coefficients, $$r_n = \sum_j h_j s_{n-j} + w_n.$$

Thus, the next, in this example, received data point is given by $$r_8 = h_1 s_7 + h_0 s_8 + w_8 \quad (2)$$

with the received data point, here $r_8$, being a function of the symbol for that data point, $s_8$, plus delayed versions of the previous symbol, $r_7$, plus noise and interference, $w_8$, for that data point. In this example, only the immediately prior symbol is used in estimating the current symbol, but further prior symbols could be used.

The CP restorer 72 applies cyclic prefix restoration to the received data r. During the first iteration CP restoration is done by using the received data r, a gain factor a, and the previously estimated symbol $\hat{s}_{-1}$ (estimated from the previous block of N symbols, and set to a default value, such as zero, if no previous symbol estimate exists) to yield the vector $y^{(1)}$, where the superscript (1) denotes the first iteration. Here, it is assumed that the previously estimated symbol corresponds to the correct transmitted symbol, i.e. $\hat{s}_{-1} = s_{-1}$. The vector $y^{(1)}$ is then:

$$\underbrace{\begin{bmatrix} y_0^{(1)} \\ y_1^{(1)} \\ \vdots \\ y_7^{(1)} \end{bmatrix}}_{y^{(1)}} = \begin{bmatrix} r_0 - h_1 s_{-1} + a r_8 \\ r_1 \\ \vdots \\ r_7 \end{bmatrix} \quad (3a)$$

$$= \underbrace{\begin{bmatrix} h_0 & & & h_1 \\ h_1 & h_0 & & \\ & \ddots & \ddots & \\ & & h_1 & h_0 \end{bmatrix}}_{F^{-1}CF} \underbrace{\begin{bmatrix} s_0 \\ s_1 \\ \vdots \\ s_7 \end{bmatrix}}_{s} + \quad (3b)$$

$$\begin{bmatrix} w_0 + a w_8 \\ w_1 \\ \vdots \\ w_7 \end{bmatrix} + \begin{bmatrix} \cdots & 0 & (a-1)h_1 \\ & \cdots & 0 \\ & & \vdots \end{bmatrix} \begin{bmatrix} s_0 \\ s_1 \\ \vdots \\ s_7 \end{bmatrix} +$$

$$\underbrace{\begin{bmatrix} a h_0 & 0 & \cdots \\ 0 & \cdots & \\ \vdots & & \end{bmatrix} \begin{bmatrix} s_8 \\ s_9 \\ \vdots \\ s_{15} \end{bmatrix}}_{s_{pre}}$$

with the CP restoration being shown in equation (3a) and the channel matrix in equation (3b) being a circulant matrix. A general form for equations (3a) and (3b) is provided and discussed in "Efficient cyclic prefix reconstruction for coded OFDM systems," C. Park and G. Im, IEEE Communications Letters, vol. 8, no. 5, May 2004, pp. 274-276. With a circulant matrix, time domain information can be cast to the frequency domain and the matrix inverted in a simple fashion. For subsequent iterations, k=2, 3, . . . , the symbol estimates $\hat{s}_i^{(k-1)}$ (also called hard symbol estimates) derived from the previous iteration (k−1) can be used for an alternative CP restoration:

$$\underbrace{\begin{bmatrix} y_0^{(k)} \\ y_1^{(k)} \\ \vdots \\ y_7^{(k)} \end{bmatrix}}_{y^{(k)}} = \begin{bmatrix} r_0 - h_1 s_{-1} + h_1 \hat{s}_7^{(k-1)} \\ r_1 \\ \vdots \\ r_7 \end{bmatrix} \quad (4a)$$

$$= \underbrace{\begin{bmatrix} h_0 & & & h_1 \\ h_1 & h_0 & & \\ & \ddots & \ddots & \\ & & h_1 & h_0 \end{bmatrix}}_{C} \underbrace{\begin{bmatrix} s_0 \\ s_1 \\ \vdots \\ s_7 \end{bmatrix}}_{s} + \begin{bmatrix} w_0 \\ w_1 \\ \vdots \\ w_7 \end{bmatrix} + \quad (4b)$$

$$\begin{bmatrix} h_1(\hat{s}_7^{(k-1)} - s_7) \\ 0 \\ \vdots \\ 0 \end{bmatrix}$$

In equations (3) and (4) the channel matrix from equation (1) has been manipulated into circulant form and can be factored as $F^{-1}CF$ where F is a DFT (of FFT) matrix/operation, and C (the channel matrix in equation (4b)) is a circulant matrix to result in the diagonalized system in equation (6) below. The CP restorer 72 calculates the values of y using equations (3a) and (4a), using estimates of the channel coefficients h from the channel estimator 84 and hard symbol estimates from a previous iteration from the MAP detector 80, and outputs the y values to the FFT module 74. For the first iteration, the channel coefficients h are set to default values, e.g., zero.

The FFT module 74 takes an FFT of the CP restored data to yield $$x^{(k)} = F y^{(k)} \tag{5}$$

where F represents the FFT operation. The frequency domain points $x_i^{(k)}$ are shown in the power spectrum plot 60 in FIG. 4. The FFT module 74 outputs the frequency domain points $x_i^{(k)}$ to the MMSE estimator 76. With the FFT applied, the frequency domain model becomes:

$$\underbrace{\begin{bmatrix} x_0^{(k)} \\ x_1^{(k)} \\ \vdots \\ x_7^{(k)} \end{bmatrix}}_{y^{(k)}} = \begin{bmatrix} H_0 & & & \\ & H_1 & & \\ & & \ddots & \\ & & & H_7 \end{bmatrix} \underbrace{\begin{bmatrix} t_0 \\ t_1 \\ \vdots \\ t_7 \end{bmatrix}}_{t} + \begin{bmatrix} u_0 \\ u_1 \\ \vdots \\ u_7 \end{bmatrix} \tag{6}$$

where the u matrix is the Fourier transform of the w, noise, matrix, the x matrix data points are the received data in the frequency domain, the H matrix is the channel matrix in the frequency domain (provided by the channel estimator 84), and the t matrix is the Fourier transform of the symbol matrix (t=Fs) (i.e., the symbols in the frequency domain) and the data points in the t matrix are called the virtual sub-carriers, in reference to the sub-carriers in an OFDM (Orthogonal Frequency Division Multiplexing) system. Application of the principles of the FDTE 46 allow equation (1) to be rewritten as equation (6), which simplifies the matrix to be inverted and thus facilitates determination of the received symbols. For VSB modulations, the virtual sub-carriers are conjugate symmetric about half the symbol rate because the s values in the symbol matrix are real valued. Thus, $$[t_0 t_1 \ldots t_7] = [t_0 t_1 t_2 t_3 t_4 t_3^* t_2^* t_1^*] \tag{7}$$

Applying equation (7) to the system model of equation (6), the system model may be re-written as:

$$\begin{bmatrix} x_0 \\ x_1 \\ x_7^* \\ x_2 \\ x_6^* \\ x_3 \\ x_5^* \\ x_4 \end{bmatrix} = \underbrace{\begin{bmatrix} H_0 & & & & \\ & H_1 & & & \\ & H_7^* & & & \\ & & H_2 & & \\ & & H_6^* & & \\ & & & H_3 & \\ & & & H_5^* & \\ & & & & H_4 \end{bmatrix}}_{H} \begin{bmatrix} t_0 \\ t_1 \\ t_2 \\ t_3 \\ t_4 \end{bmatrix} + \begin{bmatrix} u_0 \\ u_1 \\ u_7^* \\ u_2 \\ u_6^* \\ u_3 \\ u_5^* \\ u_4 \end{bmatrix} \tag{8}$$

where, for simplicity, the indication of the iteration number (k) has been omitted. Thus, applying the symmetrical properties of VSB data, the number of frequency domain symbol values to be determined has reduced from eight, in this example, to five. Further, as seen from equation (8), all of the N received data points are used in determining the reduced set of symbols (i.e., here $x_0$ through $x_8$ are used to determine $t_0$ through $t_4$). For each virtual sub-carrier $\tilde{t}_i^{(k)}$, the equalizer 46 uses in-band data and channel estimates, i.e. $x_i^{(k)}$ and $H_i$ respectively, with corresponding out-of-band data and channel estimates, reflected over half the sampling frequency, i.e., $x_{N-i}^{(k)}$ and $H_{N-i}$ respectively. The system 10 thus exploits the symmetry to efficiently recover the transmitted symbols at the receiver 14. An advantage of this method can be seen in Equation (8), where more equations than unknown variables are being used to estimate the virtual sub-carriers.

The MMSE module 76 recovers the values for t, which are the frequency domain symbols. The MMSE module 76 applies a minimum mean squared error algorithm to recover estimated values for the t data points. The MMSE algorithm applied by the MMSE module 76 reduces error between true virtual sub-carriers and estimated virtual sub-carriers. The number of iterations performed by the MMSE module 76 can be limited in a variety of ways. For example, a variance determined by the statistics computer 82 may be monitored and iterations performed until the variance reduces to within a desired tolerance (e.g., is smaller than a desired threshold), or a maximum number of allowable iterations is performed. Alternatively, the MMSE module 76 may perform a fixed number of iterations no matter what the value of the variance (or any other factor) is. To estimate the virtual sub-carrier values for iterations after the first iteration, the MMSE module 76 uses the expected/estimated virtual sub-carrier values, and variances of these estimated values, determined by the statistics computer 82 in the immediately-prior iteration. In particular, the MMSE module 76 calculates the estimated virtual sub-carrier according to:

$$\tilde{t}^{(k)} = \bar{t}^{(k-1)} + D(v_t^{(k-1)}) H^H (HD(v_t^{(k-1)}) H^H + \sigma^2 I)^{-1} (x^{(k)} - H\bar{t}) \tag{9}$$

where $\bar{t}^{(k-1)}$ and $v_t^{(k-1)}$ are the expected value and variance of the virtual sub-carriers computed by the statistics computer 80 from the previous iteration, $D(v_t^{(k-1)})$ is the diagonal matrix comprising the elements of $v_t^{(k-1)}$, $\sigma^2$ is the power of the interference term u, I is an identity matrix, and $x^{(k)}$ is the CP restored sample in the frequency domain. The expected value $\bar{t}^{(k-1)}$ is the frequency domain mean (average) of the possible values of a particular symbol. The variance averages the squared difference between the estimated virtual sub-carriers $\tilde{t}^{(k-1)}$ and the expected value $\bar{t}^{(k-1)}$, thus providing a measure of confidence in the estimates. The expected value and the variance from the previous iteration may improve the estimation of the virtual sub-carrier, but need not be used (with the MAP detector 80 and the statistics computer 82 also not being used and thus not part of the equalizer). For the first iteration, the variance and the expected value of each symbol can be set to respective default values, e.g., unity and zero, although the default values need not be zero and need not be the same for the expected value and variance, or the same for each symbol expected value.

Some mathematical manipulations can be used to restructure equation (9) to provide insight into its use. To further illustrate the MMSE estimation over each iteration k, define $G^{(k-1)} = H^H (HD(v_t^{(k-1)}) H^H + \sigma^2 I)^{-1}$ and rewrite equation (9) as $$\tilde{t}^{(k)} = (I - D(v_t^{(k-1)}) G^{(k-1)} H) \bar{t}^{(k-1)} + D(v_t^{(k-1)}) G^{(k-1)} x^{(k)} \tag{9a}$$

The first component (before the plus sign) of the MMSE estimate in equation (9a) is approximately equal to the virtual sub-carrier estimates $\bar{t}^{(k-1)}$ using the a priori information from the statistics computer 82 (described below) times the degree of confidence in that estimate according to the factor $(I - D(v_t^{(k-1)}) G^{(k-1)} H)$. The second component (after the plus sign) of the MMSE estimation is based on the estimates from the CP restored data $G^{(k-1)} x^{(k)}$ and the lack of confidence of the expected value according to the factor $D(v_t^{(k-1)})$. For the first iteration, k=1, the variance is 1 and the mean symbol value of the prior iteration (which is nonexistent) is zero, i.e., $v_t^{(k-1)} = [1 \ldots 1]^T$ and $\bar{t}^{(0)} = 0$ and therefore $\bar{t}^{(1)} = H^H(HH^H + \sigma^2 I)^{-1}x^{(1)}$. As iterations progress, assuming the variance approaches zero, i.e., $v_t^{(k-1)} \rightarrow [0 \ldots 0]^T$, then the estimated symbol approaches the mean symbol estimate from the previous iteration, which approaches the actual symbol, i.e., $\bar{t}^{(k)} \rightarrow \bar{t}^{(k-1)} \rightarrow t$.

While equation (8) provides a specific example, for N=8, of the relationship of the received data, x, the channel model H, the transmitted data t, and the noise/interference u, a general form for this relationship is given by:

$$H = \begin{bmatrix} H_0 & & & & & & \\ & H_1 & & & & & \\ & & H_{N-1}^* & & & & \\ & & & \ddots & & & \\ & & & & \ddots & & \\ & & & & & H_{N/2-1} & \\ & & & & & & H_{N/2+1}^* \\ & & & & & & & H_{N/2} \end{bmatrix} \quad (10)$$

Using this form, each virtual sub-carrier is given by $$\bar{t}_i^{(k)} = \bar{t}_i^{(k-1)} + v_{t_i}^{(k-1)} \frac{\operatorname{Re}(H_i^* x_i^{(k)}) - |H_i|^2 \bar{t}_i^{(k-1)}}{v_{t_i}^{(k-1)}|H_i|^2 + \sigma^2}, \, i = 0, N/2 \quad (11)$$

and $$\bar{t}_i^{(k)} = \bar{t}_i^{(k-1)} + v_{t_i}^{(k-1)} \frac{\operatorname{Re}(H_i^* x_i^{(k)} + H_{N-i} x_{N-i}^{(k)*}) - (|H_i|^2 + |H_{N-i}|^2)\bar{t}_i^{(k-1)}}{v_{t_i}^{(k-1)}(|H_i|^2 + |H_{N-i}|^2) + \sigma^2}, \quad (12)$$

$i \in \{1, \ldots, N/2 - 1\}$ where equations (11) and (12) provide the generic form of equation (9) for the respective values of i shown.

The FFT module 78 receives the frequency domain symbol estimates $\bar{t}_i^{(k)}$ derived using equation (9) from the MMSE estimator 76 and converts them into the time domain. The FFT module 78 takes the inverse FFT of the MMSE virtual sub-carriers, while using the conjugate symmetric property of equation (7) to produce soft symbol estimates according to $$\tilde{s}^{(k)} = F^{-1}[\bar{t}_0^{(k)} \bar{t}_1^{(k)} \bar{t}_2^{(k)} \bar{t}_3^{(k)} \bar{t}_4^{(k)} \bar{t}_3^{(k)*} \bar{t}_2^{(k)*} \bar{t}_1^{(k)*}]^T. \quad (13)$$

In equation (13), the conjugate-symmetric nature of the information being used is exploited to recover the transmitted symbols $\bar{t}_i^{(k)}$. Using equation (13), the recovered symbol estimates are real valued (because the inverse FFT of a symmetric vector as in equation (13) is real valued), as are the originally transmitted data. The FFT module 78 outputs the soft symbol stream of the last iteration, k, to the channel decoder 48 (FIG. 3), and to the MAP detector 80.

Figure 6:
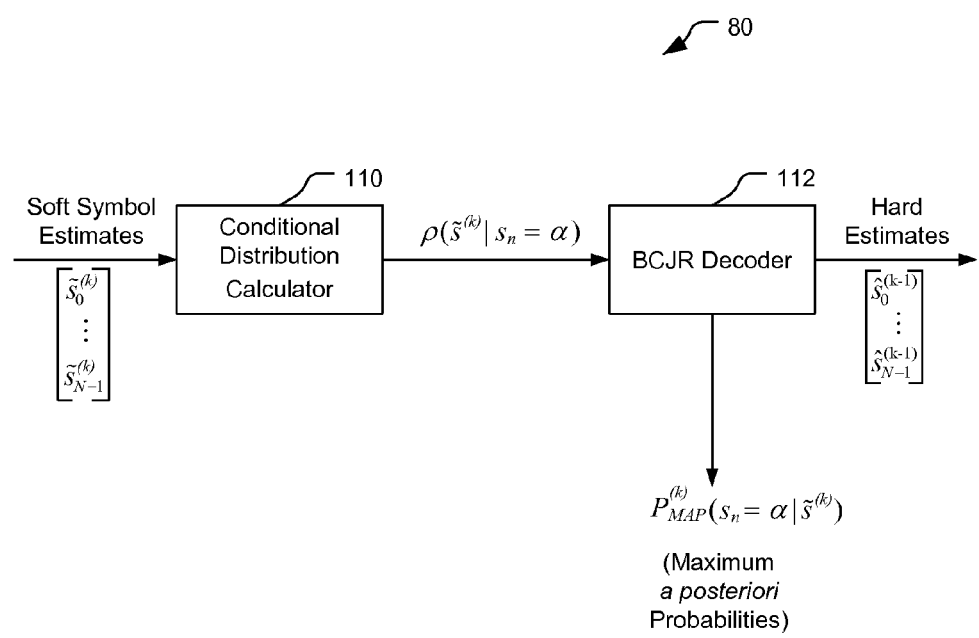
FIG. 6 is a block diagram of functional elements of, and process flow in, a MAP detector shown in FIG. 5.

Referring also to FIG. 6, the MAP (maximum a posteriori) detector 80 includes a conditional distribution calculator 110 and a BCJR decoder 112. The MAP detector 80 receives the soft symbol estimates from the FFT module 78 and converts these into hard symbol estimates $\hat{s}_n^{(k)}$. The MAP detector 80 increases, possibly maximizes, the probability that a particular symbol $s_n$ has been transmitted given the soft symbol information from the symbol estimator 70. This probability is referred to as the a posteriori probability $P_{MAP}^{(k)}(s_n = \alpha | \tilde{s}^{(k)})$. The MAP detector 80 derives the a posteriori probability from a soft estimate distribution function conditioned on each possible symbol, i.e. $\rho(\tilde{s}_n^{(k)} | s_n = \alpha)$. For example, for VSB, the possible symbols are ±1, ±3, ±5, and ±7, and if a soft symbol estimate is 1.1, then the probabilities for each possible symbol might be 0.95 for symbol +1, 0.02 for −1 and +3, and 0.01 for all others combined. The conditional distribution calculator 110 evaluates soft estimate conditional distributions $\rho(\tilde{s}_n^{(k)} | s_n = \alpha)$, given by equation (15) and is described below. In particular, the MAP detector 80 calculates hard symbol estimates according to $$\hat{s}_n^{(k)} = \arg\max_{\alpha \in S} \underbrace{p(s_n = \alpha | \tilde{s}^{(k)})}_{P_{MAP}^{(k)}(s_n = \alpha | \tilde{s}^{(k)})}. \quad (14)$$

The MAP detector 80 outputs the hard estimates to the CP restorer 72 and to the channel estimator 84.

The BCJR decoder 112 performs the MAP detection, taking as inputs the conditional distribution $\rho(\tilde{s}_n^{(k)} | s_n = \alpha)$. In this embodiment, it is assumed that a priori probabilities are evenly distributed (i.e., $p^{(k-1)}(s_n = \alpha) = \frac{1}{8}$ for 8-VSB) to generate and increase, and possibly maximize, the a posteriori probabilities shown in the intermediate stage in equation (14). This, however, is not necessary and the output MAP probabilities could be used as input a priori (not evenly distributed) probabilities in the subsequent iteration.

The MAP detector 80 uses the conditional distributions evaluated at the soft symbol estimates and at each possible transmitted symbol value α. The conditional distribution may be approximated by $$\rho(\tilde{s}_n^{(k)} | s_n = \alpha) = \frac{1}{\sqrt{2\pi\sigma_{n,\alpha}^2}} \exp\left(-\frac{(\tilde{s}_n^{(k)} - \mu_{n,\alpha})^2}{2\sigma_{n,\alpha}^2}\right) \quad (15)$$

where the mean $\mu_{n,\alpha}$ and variance $\sigma_{n,\alpha}^2$ are computed by expanding equations (13) and (9) for $\tilde{s}_n^{(k)}$ as a sum of the symbol value α and the contribution of the interference from other symbols and the channel noise. The MAP detector 80, in particular the BCJR decoder 112, sends the maximum a posteriori probabilities to the statistics computer 82.

The statistics computer 82 uses the conditional probabilities from the MAP detector 80 to derive the expected value and variance statistics of the virtual sub-carriers. The statistics computer 82 computes the expected value and variance according to $$\bar{s}_n^{(k)} = \sum_{\alpha_i \in S} \alpha_i P_{MAP}^{(k)}(s_n = \alpha_i | \tilde{s}^{(k)}) \quad (16)$$

$$v_{s_n}^{(k)} = \sum_{\alpha_i \in S} |\alpha_i|^2 P_{MAP}^{(k)}(s_n = \alpha_i | \tilde{s}_n^{(k)}) - \bar{s}_n^{(k)} \quad (17)$$

where s is the source constellation (i.e., s={±1, ±3, ±5, ±7} for 8-VSB). The statistics computer 82 transforms these parameters to the frequency domain by taking the FFT of equations (16) and (17) to obtain corresponding quantities for the virtual sub-carriers according to $$\bar{t}^{(k)} = F\bar{s}^{(k)} \quad (18)$$

$$v_{t_n}^{(k)} = [FD(v_s^{(k)})F^H]_{n,n}. \quad (19)$$

Preferably, however, the statistics computer 82 determines the average virtual sub-carrier variance according to $$v_{t_n}^{(k)} = [FD(v_s^{(k)})F^H]_{n,n} \quad (20)$$

That simplifies computations.

The channel estimator 84 uses the hard symbol estimates received from the MAP detector 80 to estimate the channel coefficients for use by the MMSE estimator module 78. Although channel estimation may be performed in other ways, here the channel estimator 84 performs a cross-correlation of the hard symbol estimates from the MAP detector 80 with the received data such that if the hard symbol estimates are correct, i.e., $\hat{s}_n = s_n$, then channel impulse response estimates are given by averaging according to $$\hat{h}_i = \frac{E\{r_n \hat{s}_{n-i}\}}{E\{s_n^2\}}. \quad (21)$$

Assuming an iid (independent and identically distributed) system, unbiased channel impulse response estimates are given by $\hat{h}_i = h_i$ because $r_n = h_0 s_n + h_1 s_{n-1} + \ldots + h_M s_{n-M} + w_n$. Preferably, the channel estimator 84 implements the averaging in equation (21) with a leaky integration according to $$\hat{h}_i^l = (1-\lambda)\hat{h}_i^{l-1} + \lambda \frac{r_n \hat{s}_{n-i}}{E\{s_n^2\}}, \; 0 < \lambda << 1. \quad (22)$$

The channel estimator 84 preferably updates the channel impulse response estimates after each iteration k of the equalizer 46 as more accurate hard symbol estimates may improve the channel impulse response estimates. The channel estimator 84 further converts the time-domain impulse response estimates to the frequency domain using an N-point FFT, with a length of the channel estimate being less than or equal to N coefficients. The resulting channel coefficients are provided to the MMSE module 78 for use as described above. Further detail of channel estimation implemented by the channel estimator 84 is described in "Performance analysis of Godard-based blind channel identification," P. Schniter, R. A. Casas, A. Touzni, C. R. Johnson, Jr., IEEE Transactions on Signal Processing, September 1999.

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations.

Further reductions in calculation complexity may also be implemented. For example, referring to FIG. 4 and equations (8) and (12), estimation complexity may be reduced by setting (e.g., to zero) out-of-band data $x_{N-1}^{(k)}$ and channel estimates $H_{N-i}$ for some i, in particular for points in a frequency range 90 between in-band edges 92, 94, where the out-of-band data are reduced in amplitude. The values of x in the range 90 are very nearly zero. Thus, while the actual values of x in the frequency range 90 may be used in equations (8) and 12, the x values in this range 90 may be set to zero, which simplifies the calculations for equations (8) and (12).

Further, while the description above refers to the invention, the description may include more than one invention.

What is claimed is:

1. A digital communications receiver, comprising:
   an input configured to receive, via a communications channel, a received first signal representing a sequence of symbols, each symbol being encoded to be representative of a plurality of data bits;
   a processor configured to adjust a magnitude and filter the received signal; and
   an equalizer configured to apply a cyclic prefix restoration to the adjusted and filtered signal, producing a second signal, to convert the second signal from time domain to frequency domain to produce a frequency domain signal, and to determine a first quantity of values representing a first portion of the symbols by evaluating a relationship of channel values representing characteristics of the communications channel and a second quantity of values representing a portion of the frequency domain signal, the first quantity being smaller than the second quantity.

2. The digital communications receiver of claim 1 wherein the equalizer is further configured to use conjugates of some of the first quantity of values to determine a third quantity of values representing a second portion of the symbols, the second quantity equaling the first quantity plus the third quantity.

3. The digital communications receiver of claim 2 wherein the first and second portions of the symbols are disposed on opposite sides of half of a sampling rate for the received signal.

4. The digital communications receiver of claim 2, further comprising a MAP detector to apply MAP detection to values related to the third quantity of symbol values.

5. The digital communications receiver of claim 1 wherein the equalizer further comprises:
   a cyclic prefix (CP) restorer, wherein the CP restorer applies the cyclic prefix restoration to the adjusted and filtered signal; and
   a fast fourier transform (FFT) device for producing the frequency domain signal.

6. The digital communications receiver of claim 1 wherein the equalizer performs the determining by iterating each of the first quantity of values using, for a respective one of the first quantity of values:
   information of a previous iteration value; and
   a variance associated with the previous iteration value.

7. The digital communications receiver of claim 6 wherein the equalizer uses an expected value of a symbol for the using of the information of a previous iteration value.

8. The digital communications receiver of claim 6 wherein the equalizer is further configured to determine the variance and the confidence using probabilities that an estimated value of the first quantity of values is correct.

9. The digital communications receiver of claim 1 wherein the equalizer is further configured to determine the characteristics of the channel using estimates of values of the first quantity of values.

10. The digital communications receiver of claim 1 wherein the second quantity of values includes in-band and out-of-band values.

11. The digital communications receiver of claim 1 wherein the second quantity of values includes in-band values, and the determining includes setting out-of-band values to zero.

12. A digital communications receiver, comprising:
   an input configured to receive, via a communications channel, a received first signal representing a sequence of symbols, each symbol being encoded to be representative of a plurality of data bits;
   a processor configured to adjust a magnitude and filter the received signal; and an equalizer configured to apply a cyclic prefix restoration to the adjusted and filtered signal, producing a second signal, to convert the second signal from time domain to frequency domain to produce a frequency domain signal, and to determine a first quantity of values representing a first portion of the symbols by evaluating a relationship of channel values representing characteristics of the communications channel and a second quantity of values representing a portion of the frequency domain signal, the first quantity being smaller than the second quantity, the equalizer comprising:
- a cyclic prefix (CP) restorer for applying the cyclic prefix restoration to the adjusted and filtered signal;
- a fast fourier transform (FFT) device for producing the frequency domain signal;
- a minimum mean squared error (MMSE) device for estimating frequency domain virtual sub-carriers; and
- an estimator for using conjugates of some of the first quantity of values to determine a third quantity of values representing a second portion of the symbols, the second quantity equaling the first quantity plus the third quantity and wherein the first and second portions of the symbols are disposed on opposite sides of half of a sampling rate for the received signal.

13. The digital communications receiver of claim 12, further comprising a MAP detector to apply MAP detection to values related to the third quantity of symbol values.

14. The digital communications receiver of claim 12 wherein the second quantity of values includes in-band and out-of-band values.

15. The digital communications receiver of claim 12 wherein the second quantity of values includes in-band values, and the determining includes setting out-of-band values to zero.

16. An integrated circuit chip (IC) for receiving and processing a VSB signal, comprising:
- input circuitry configured to receive, via a communications channel, a received first signal representing a sequence of symbols, each symbol being encoded to be representative of a plurality of data bits;
- circuitry configured to adjust a magnitude and filter the received signal; and
- circuitry configured to apply a cyclic prefix restoration to the adjusted and filtered signal, producing a second signal, to convert the second signal from time domain to frequency domain to produce a frequency domain signal, and to determine a first quantity of values representing a first portion of the symbols by evaluating a relationship of channel values representing characteristics of the communications channel and a second quantity of values representing a portion of the frequency domain signal, the first quantity being smaller than the second quantity.

17. The IC of claim 16, further comprising circuitry configured to use conjugates of some of the first quantity of values to determine a third quantity of values representing a second portion of the symbols, the second quantity equaling the first quantity plus the third quantity and wherein the first and second portions of the symbols are disposed on opposite sides of half of a sampling rate for the received signal.

* * * * *